United States Patent [19]
Dahl et al.

[11] Patent Number: 5,674,466
[45] Date of Patent: Oct. 7, 1997

[54] METHOD OF PRODUCING CHLORINE DIOXIDE

[75] Inventors: Anders Dahl, Saltsjö-Boo; Roy Hammer-Olsen, Sundsvall; Philip Byrne, Tullinge, all of Sweden

[73] Assignee: Eka Nobel AB, Bohus, Sweden

[21] Appl. No.: 659,183

[22] Filed: Jun. 6, 1996

[30] Foreign Application Priority Data

Jun. 7, 1995 [SE] Sweden ............................ 9502077

[51] Int. Cl.$^6$ ................................................. C01B 11/02
[52] U.S. Cl. ........................... 423/478; 423/551; 423/531
[58] Field of Search .................................... 423/477, 478, 423/531, 551, 522

[56] References Cited

U.S. PATENT DOCUMENTS

| | | | |
|---|---|---|---|
| 3,341,288 | 9/1967 | Partridge et al. | 423/478 |
| 3,754,081 | 8/1973 | De Vere Partridge et al. | 423/478 |
| 3,974,266 | 8/1976 | Fuller | 423/478 |
| 4,081,520 | 3/1978 | Swindells et al. | 423/478 |
| 4,104,365 | 8/1978 | Howard et al. | 423/531 |
| 4,325,934 | 4/1982 | Swindells et al. | 423/478 |
| 5,116,595 | 5/1992 | Scribner et al. | 423/477 |
| 5,399,332 | 3/1995 | Pu | 423/478 |

FOREIGN PATENT DOCUMENTS

| | | |
|---|---|---|
| 445493 | 9/1991 | European Pat. Off. |
| 9411300 | 5/1994 | WIPO |

*Primary Examiner*—Ngoc-Yen Nguyen
*Attorney, Agent, or Firm*—Leydig, Voit & Mayer

[57] ABSTRACT

The invention relates to a process of producing chlorine dioxide comprising the steps of reducing chlorate ions in an acid reaction medium maintained in a reaction zone of a chlorine dioxide generator, which reaction medium contains alkali metal ions and sulfate ions, so to form chlorine dioxide and a solid salt of acidic alkali metal sulfate. The process further comprises the steps of separating said solid acidic alkali metal sulfate from the reaction medium, contacting said solid acidic alkali metal sulfate with an acid aqueous medium in a mixing tank to effect at least partial conversion to neutral solid alkali metal sulfate, separating the at least partially neutralized solid alkali metal sulfate from the acid aqueous medium on a filter and forming an acid filtrate, feeding at least a portion of said acid filtrate to the mixing tank, and transferring an acid aqueous medium to the reaction zone of the chlorine dioxide generator, which acid aqueous medium is a portion of the acid filtrate or acid aqueous medium from the mixing tank or a mixture thereof.

10 Claims, 1 Drawing Sheet

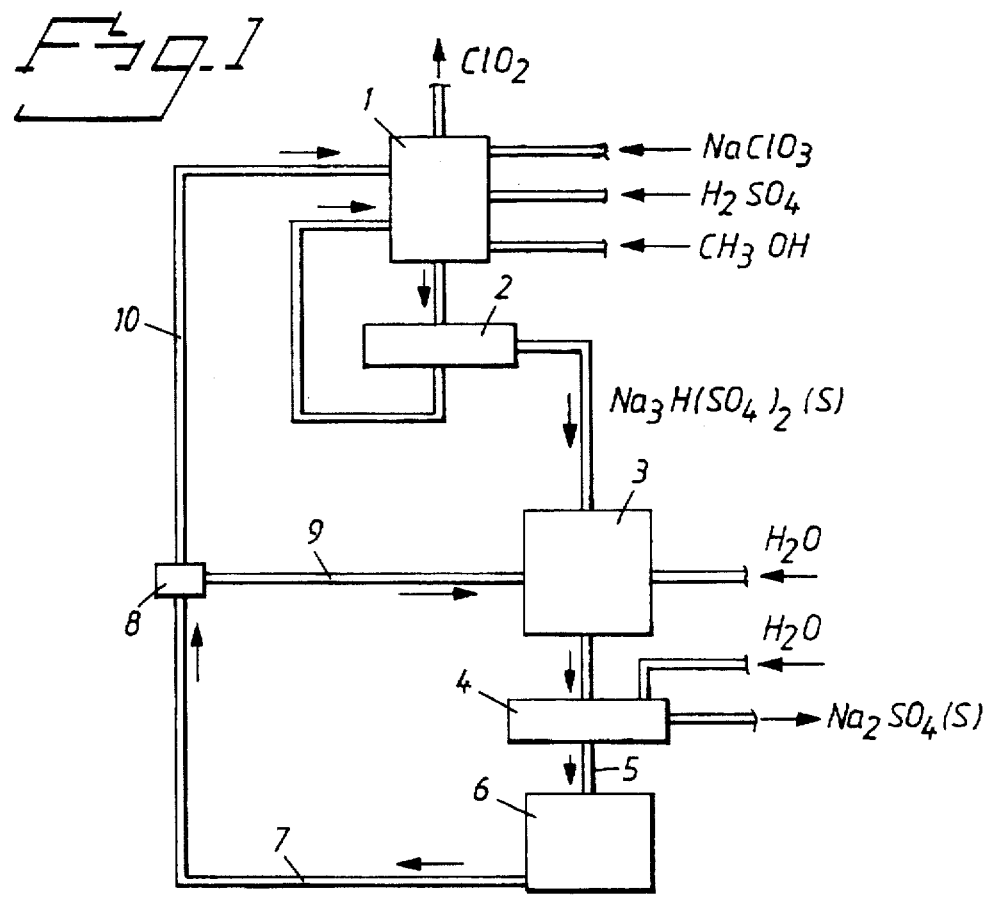
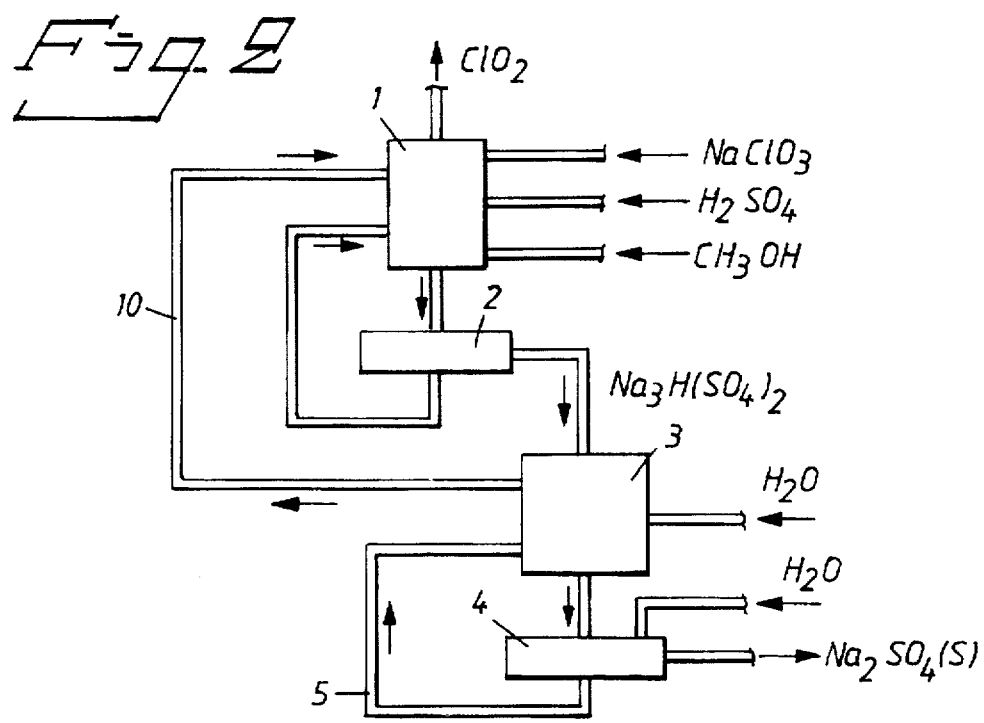

METHOD OF PRODUCING CHLORINE DIOXIDE

The present invention relates to a process of producing chlorine dioxide involving formation of solid acidic alkali metal sulfate as a by-product. The process comprises a step of decreasing the acidity of the alkali metal sulfate by treatment with an aqueous medium.

BACKGROUND OF THE INVENTION

Chlorine dioxide used in aqueous solution is of considerable commercial interest, mainly in pulp bleaching, but also in water purification, fat bleaching, removal of phenols from industrial wastes etc. It is therefore desirable to provide processes in which chlorine dioxide can be efficiently produced.

There are numerous different processes for chlorine dioxide production. Most processes in commercial use involves continuous reaction of alkali metal chlorate in an acidic medium with a reducing agent such as methanol, hydrogen peroxide, chloride ions or sulfur dioxide. The most efficient processes are operated at subatmospheric pressure in which the reaction medium boils and water is evaporated to dilute the chlorine dioxide formed. Generally, the acidity is provided by addition of sulfuric acid and the sulfate is withdrawn as a by-product in the form of solid alkali metal sulfate, normally sodium sulfate. If methanol is used as the reducing agent, it is possible to produce chlorine dioxide without formation or with very low formation of chlorine as a by-product. However, in order to achieve satisfactory production rate, it is necessary to operate the process at a high acidity, causing also the by-product alkali metal sulfate to be acidic. Thus, in the most commonly used subatmospheric processes operated with methanol as the reducing agent, such as in those described in the U.S. Pat. No. 4,081,520 or EP patent 445493, the solid by-product formed is acidic sodium sulfate, normally sodium sesqui sulfate. The acidic sodium sulfate normally has to be neutralized which causes consumption of caustic. Further, the acid lost with the acidic sulfate has to be replaced by supplying more acid to the chlorine dioxide reactor.

WO 94/11300 describes a method of neutralizing acidic sodium sulfate by treatment with an aqueous medium to effect conversion of the solid material to neutral sodium sulfate. The resulting acid aqueous medium can then be recirculated to the chlorine dioxide reactor. The aqueous medium may be water or an aqueous solution of methanol, sodium chlorate or sodium chloride. Similar processes are described in the U.S. Pat. Nos. 3,975,505, 4,325,934, 5,116,595 and 5,399,332.

Using solutions of methanol, chlorate and chloride is too expensive to be commercially interesting. However, when operating the prior art processes in full scale with water as the aqueous medium, it has been found that such a large amount of water has to be added that the water balance of the chlorine dioxide reactor is disturbed. If the chlorine dioxide reactor operates at subatmospheric pressure, excess water is removed from the system by evaporation, but all excess water added means that the evaporative load on the reactor increases, causing both the investment costs and the operation costs to increase.

SUMMARY OF THE INVENTION

It is an object of the present invention to provide a process of producing chlorine dioxide involving formation of acidic alkali metal sulfate as a by-product, in which process water can be used to neutralize the alkali metal sulfate without increasing the evaporative load on the chlorine dioxide reactor to an unacceptable level. The process should be simple and easy to operate without requiring too complicated and expensive equipment.

BRIEF DESCRIPTION OF THE DRAWING

FIG. 1 is a schematic of a first embodiment of the process of the invention.

FIG. 2 is a schematic of a second embodiment of the process of the invention.

DESCRIPTION OF THE PREFERRED EMBODIMENTS

The invention concerns a process of producing chlorine dioxide comprising the steps of reducing chlorate lens in an acid reaction medium maintained in a reaction zone of a chlorine dioxide generator, which reaction medium contains alkali metal ions and sulfate ions, so to form chlorine dioxide and a solid salt of acidic alkali metal sulfate. The process further comprises the steps of separating said solid acidic alkali metal sulfate from the reaction medium, contacting said solid acidic alkali metal sulfate with an acid aqueous medium in a mixing tank to effect at least partial conversion to neutral solid alkali metal sulfate, separating the at least partially neutralized solid alkali metal sulfate from the acid aqueous medium on a filter and forming an acid filtrate, feeding at least a portion of said acid filtrate to the mixing tank, and transferring an acid aqueous medium to the reaction zone of the chlorine dioxide generator, which acid aqueous medium is a portion of the acid filtrate or acid aqueous medium from the mixing tank or a mixture thereof. Suitably, the process is operated to obtain an acidity of the aqueous medium transferred to the reaction zone of the chlorine dioxide reactor exceeding 4.8N, preferably exceeding about 5.5N, most preferably exceeding about 6.5N. Generally it is hard to obtain an acidity exceeding about 7N.

Suitably, the at least partially neutralized alkali metal sulfate is washed on the filter with an aqueous medium, preferably water, so to obtain alkali metal sulfate containing less than about 2% by weight of $H_2SO_4$, preferably less than about 1.5% by weight of $H_2SO_4$, most preferably less then about 1% by weight of $H_2SO_4$. The acid filtrate preferably is a mixture of filtered medium from the mixing tank and spent washing water. It is preferred to operate the process to achieve an acidity in the acid filtrate exceeding about 4.8N, preferably exceeding about 5.5N, most preferably exceeding about 6.5N. Generally it is hard to obtain an acidity above about 7N.

Suitably, an aqueous medium, preferably water, is supplied to the mixing tank in addition to the acid filtrate. Preferably, from about 5 to about 100%, most preferably from about 10 to about 90%, particularly from about 10 to about 25% of the total amount of water added to the system for neutralizing the alkali metal sulfate is supplied to the filter for washing the solid alkali metal sulfate, the remaining part preferably being supplied to the mixing tank. Suitably, the total amount of water added to the system is from about 0.1 to about 1 kg per kg alkali metal sulfate, preferably from about 0.3 to about 0.5 kg per kg acidic alkali metal sulfate.

Preferably, the average contact time between the solid alkali metal sulfate and the aqueous medium in the mixing tank is from about 5 minutes to about 5 hours. Preferably, the acidity of the aqueous medium in the mixing tank is maintained from about 4.8 to about 7N, most preferably from about 5.5 to about 6.5N. Suitably, the temperature in the mixing tank is maintained from about 20° to about 100° C., preferably, from about 40° to about 100° C., most preferably from about 60° to about 80° C. The temperature at the filter does not seem to significantly affect the efficiency of the performances and may for example be maintained from about 20° to about 100° C.

In one preferred embodiment, the acid aqueous medium transferred to the reaction zone of the chlorine dioxide generator substantially consists of acid filtrate from the filter for separating the solid alkali metal sulfate from the aqueous medium in the mixing tank. Preferably, from about 5 to about 40%, most preferably from about 10 to about 20% of the acid filtrate is transferred to the chlorine dioxide generator, the remaining portion preferably being fed to the mixing tank for contacting the acidic alkali metal sulfate. In this embodiment it is preferred that from 10 to 20% of the total amount of water added to the system for neutralizing the alkali metal sulfate is supplied to the filter for washing the solid alkali metal sulfate, the remaining part preferably being supplied to the mixing tank. In a preferred mode of operation, the acid filtrate is first transferred to a filtrate tank, for example by gravity, and then pumped to a device, for example a control valve, for dividing the filtrate stream into one portion fed to the mixing tank and into another portion supplied to the chlorine dioxide generator. The use of the filtrate tank enables more stable operation since control valves do not work satisfactory if they are fed with a fluctuating flow which normally is the case with liquid streams coming directly from a filter.

In another preferred embodiment, the acid aqueous medium transferred to the reaction zone of the chlorine dioxide generator substantially consists of acid aqueous medium from the mixing tank. It is preferred to separate the main part of the solid material, for example by decantation, or the like, before feeding the acid medium to the chlorine dioxide generator. In this embodiment it is preferred that substantially all the acid filtrate is fed to the mixing tank. It is also preferred that from about 5 to about 25% of the total amount of water added to the system for neutralizing the alkali metal sulfate is supplied to the filter for washing the solid alkali metal sulfate, the remaining part preferably being supplied to the mixing tank.

The chlorine dioxide generation as such can be performed according to any known, preferably continuous process involving formation of solid acidic alkali metal sulfate which normally is the case if the acidity of the reaction medium exceeds about 4.5N and preferably is from about 5 to about 9N. Examples of useful chlorine dioxide processes are the SVP®-lite process or the R8 process which are described in the earlier mentioned EP patent 445493 and U.S. Pat. No. 4,081,520 respectively, the disclosures of which are incorporated herein by reference. The alkali metal could be any group I metal such as sodium, potassium or mixtures thereof, of which sodium normally is preferred. The acidic alkali metal sulfate formed in the chlorine dioxide generator is normally alkali metal sesqui sulfate, preferably sodium sesqui sulfate.

The invention will now be described in detail with reference to the drawings, of which FIG. 1 and FIG. 2 schematically show two different embodiments. However, the invention is not limited to the shown embodiments, but many different modes of operation are possible within the scope of the claims.

Referring to FIG. 1, sodium chlorate, sulfuric acid and methanol are supplied to a chlorine dioxide generator 1, preferably operated according to any of the SVP®-lite or the R8 processes. In the generator 1 an acid aqueous reaction medium containing sodium ions, sulfate ions and chlorate ions is maintained at subatmospheric pressure at a temperature sufficient to effect boiling. Chlorate ions are reduced by methanol to form chlorine dioxide gas which is withdrawn together with evaporated water. Solid sodium sesqui sulfate precipitates and is separated from the reaction medium on a first filter 2 and transferred to a mixing tank 3 in which it is contacted with an acid aqueous solution containing sodium sulfate to form a slurry, the acidity of the solution preferably being from about 5.5 to about 6.5N. In the mixing tank 3 the solid sodium sesqui sulfate is partially converted to neutral sodium sulfate which is separated from the aqueous solution on a second filter 4 on which the filter cake is washed with sufficient water to obtain solid sodium sulfate containing less than about 2% by weight of $H_2SO_4$. The acid aqueous solution and the spent washing water are mixed to form an acid filtrate 5 which is transferred to a filtrate tank 6. The washing water can be added in one or several steps. It is also possible to wash in a first step with acid filtrate and in a second step with water. An acid filtrate stream 7 is pumped to a device 8, for example a control valve, dividing the acid filtrate 7 to one stream 9 leading to the mixing tank 3, and another stream 10 leading back to the chlorine dioxide generator 1. The stream 10 preferably constitutes from about 10 to about 20% of the total acid filtrate stream 7. The amount of water added to the mixing tank 3 is preferably from about 0.28 to about 0.45 kg per kg sodium sesqui sulfate. The amount of water added to the second filter 4 for washing is preferably from about 0.04 to about 0.1 kg per kg sodium sesqui sulfate. Both the filters 2, 4 are preferably rotating drum filter operating with vacuum inside the drums. It is preferred that at least the second filter 4 is a bottom feed filter without any cyclone or similar device for pre-concentrating the slurry, which enables more stable operation of the entire process than if a conventional top feed filter is used. Preferably also the first filter 2 is a bottom feed filter of the same or similar construction. The entire process is preferably operated continuously.

Referring to FIG. 2, the chlorine dioxide generator 1, the first filter 2, the mixing tank 3 and the second filter 4 is operated substantially as described in the embodiment of FIG. 1. However, the entire acid filtrate stream 5 is transferred to the mixing tank 3 and acid aqueous medium from the tank 3 is recycled to the generator 1, preferably after some kind of sedimentation or other treatment to decrease the amount of solids being brought back to the generator 1. The amount of water added to the mixing tank 3 is preferably from about 0.28 to about 0.45 kg per kg sodium sesqui sulfate. The amount of water added to the second filter 4 for washing is preferably from about 0.04 to about 0.1 kg per kg sodium sulfate. The acidity of the solution in the mixing tank 3 is preferably from about 5.5 to about 6.5N.

Example: An embodiment of the invention was simulated in lab scale by the following experiment: 300 g salt cake consisting of 50.4 g $H_2SO_4$, 221.7 g $Na_2SO_4$ and 27.9 g $H_2O$ was mixed with 100 ml of an aqueous solution of 7.39 g $H_2SO_4$ and 42.38 g $Na_2SO_4$ in a beaker at about 65° C. and was maintained under agitation for some minutes. The solid material was filtered off and the remaining 130 ml aqueous phase had an acidity of 6.0N. The filter cake was then washed with 49.3 ml of an aqueous solution of 0.939 g $H_2SO_4$ and 20.67 g $Na_2SO_4$, resulting in 52.5 ml of an aqueous filtrate containing 10.53 g $H_2SO_4$ and 14.8 g $Na_2SO_4$. The filter cake was then washed with 49.38 g of pure water, resulting in 58.4 ml of an aqueous filtrate containing 5.21 g $H_2SO_4$ and 35.1 g $Na_2SO_4$ and in 157 g of a solid filter cake containing 0.581 g $H_2SO_4$, 140.88 g $Na_2SO_4$ and 15.54 g $H_2SO_4$. Thus, it was shown possible to obtain a salt cake containing less than 1% by weight of sulfuric acid and an aqueous stream with an acidity of 6N.

We claim:

1. A process of producing chlorine dioxide comprising the steps of reducing chlorate ions in an acid reaction medium maintained in a reaction zone of a chlorine dioxide generator, which reaction medium contains alkali metal ions and sulfate ions, thereby forming chlorine dioxide and a solid salt of acidic alkali metal sulfate, the separating said solid acidic alkali metal sulfate from the reaction medium, contacting said solid acidic alkali metal sulfate with an acid aqueous medium in a mixing tank to effect at least partial conversion to neutral solid alkali metal sulfate, separating the at least partially neutralized solid alkali metal sulfate from the acid aqueous medium on a filter and forming an acid filtrate, feeding at least a portion of said acid filtrate to the mixing tank, and transferring an acid aqueous solution to the reaction zone of the chlorine dioxide generator, which acid aqueous solution is a portion of the acid filtrate or portion of the acid aqueous medium from the mixing tank or a mixture thereof.

2. A process as claimed in claim 1, wherein the at least partially neutralized alkali metal sulfate is washed on the filter with an aqueous medium so to obtain alkali metal sulfate containing less than about 2% by weight of $H_2SO_4$.

3. A process as claimed in claim 2, wherein in that the at least partially neutralized alkali metal sulfate is washed on the filter with water so to obtain alkali metal sulfate containing less than about 2% by weight of $H_2SO_4$.

4. A process as claimed in claim 1 wherein the acidity of the acid aqueous medium in the mixing tank is maintained from about 4.8 to about 7N.

5. A process as claimed in claim 1 wherein, water is supplied to the mixing tank in addition to the acid filtrate.

6. A process as claimed in claim 1 including the step of adding water to the mixing tank and the filter, and wherein from about 10 to about 90% of the total amount of water added is added to the filter for washing the at least partially neutralized solid alkali metal sulfate, the remaining part being added to the mixing tank.

7. A process as claimed in claim 1 wherein, the acid aqueous solution transferred to the reaction zone of the chlorine dioxide generator consists essentially of acid filtrate from the filter for separating the solid alkali metal sulfate from the acid aqueous medium in the mixing tank.

8. A process as claimed in claim 7, wherein the acid filtrate is first transferred to a filtrate tank and then pumped to a device for dividing the filtrate stream into one portion which is fed to the mixing tank and into another portion which is supplied to the chlorine dioxide generator.

9. A process as claimed in claim 1 wherein, the acid aqueous solution transferred to the reaction zone of the chlorine dioxide generator consists essentially of acid aqueous medium from the mixing tank.

10. A process as claimed in claim 1 wherein, the process is operated to obtain an acidity of the acid aqueous solution transferred to the reaction zone of the chlorine dioxide reactor exceeds 4.8N.

* * * * *